US011431712B2

(12) United States Patent
dos Santos Silva et al.

(10) Patent No.: US 11,431,712 B2
(45) Date of Patent: Aug. 30, 2022

(54) SYSTEM AND METHOD FOR PERSONALIZED PASSENGER AUDITING IN AIRCRAFTS

(71) Applicant: International Business Machines Corporation, Armonk, NY (US)

(72) Inventors: Bruno dos Santos Silva, McKinney, TX (US); Diogo Tadeu Silva De Araujo, Cedar Park, TX (US); Sylvain Meras, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/425,051

(22) Filed: May 29, 2019

(65) Prior Publication Data

US 2020/0382504 A1 Dec. 3, 2020

(51) Int. Cl.
*H04L 9/40* (2022.01)
*H04L 41/28* (2022.01)

(52) U.S. Cl.
CPC ............. *H04L 63/10* (2013.01); *H04L 41/28* (2013.01); *H04L 63/08* (2013.01); *H04L 63/1408* (2013.01); *H04L 63/20* (2013.01)

(58) Field of Classification Search
CPC ......... H04L 63/10; H04L 41/28; H04L 63/20; H04L 63/08; H04L 63/1408
USPC .......................................................... 726/4
See application file for complete search history.

(56) References Cited

U.S. PATENT DOCUMENTS

| 8,145,511 | B2 | 3/2012 | Dunsky | |
|---|---|---|---|---|
| 2007/0276706 | A1 | 11/2007 | Dunsky | |
| 2008/0046039 | A1 | 2/2008 | Corndorf | |
| 2013/0144462 | A1* | 6/2013 | Ricci | G06F 11/3013 701/1 |
| 2013/0262421 | A1 | 10/2013 | Ferguson et al. | |
| 2015/0051927 | A1 | 2/2015 | Deuser et al. | |
| 2015/0097798 | A1* | 4/2015 | Ricci | B60R 16/037 345/173 |
| 2015/0193007 | A1* | 7/2015 | Ricci | B60R 21/01512 701/36 |
| 2016/0311348 | A1* | 10/2016 | Watson | H04L 67/125 |
| 2017/0068438 | A1* | 3/2017 | Ricci | B60K 35/00 |
| 2017/0126697 | A1* | 5/2017 | Li | G06F 21/6209 |
| 2017/0134385 | A1* | 5/2017 | Mitevski | H04L 63/0815 |
| 2017/0144071 | A1* | 5/2017 | Nguyen | H04W 12/00 |
| 2017/0150939 | A1 | 6/2017 | Shah | |
| 2017/0339177 | A1* | 11/2017 | Lorello | H04L 63/1425 |
| 2018/0096021 | A1* | 4/2018 | Lotzer | G06F 21/6227 |
| 2018/0181769 | A1* | 6/2018 | Vora | H04L 67/1097 |

(Continued)

Primary Examiner — Teshome Hailu
(74) *Attorney, Agent, or Firm* — Terrile, Cannatti & Chambers, LLP; Emmanuel A. Rivera

(57) ABSTRACT

A method, system and computer-usable medium are disclosed for authenticating passengers and their activity regarding the use of resources on a transport during a trip or session on a transport. A passenger is matched to a name and/or identifier that corresponds to a seat on a transport for a specific flight. Authentication is performed based on various methods, such as set of security questions, biometric recognition, facial recognition, certificate recognition. Passenger data is exchanged with on board and remote systems that include accessibility of the passenger to a set of onboard resources. Passenger activity is monitored as to acceptable use of the resources during the flight or trip.

20 Claims, 5 Drawing Sheets

(56) References Cited

U.S. PATENT DOCUMENTS

2018/0189512 A1* 7/2018 Monaco ................ G06F 3/0608
2018/0219943 A1  8/2018 Gummig

* cited by examiner

SYSTEM AND METHOD FOR PERSONALIZED PASSENGER AUDITING IN AIRCRAFTS

BACKGROUND OF THE INVENTION

Field of the Invention

The present application relates generally to an improved data processing system and method, and more specifically for mechanisms to authenticating passengers and auditing passenger use of resources in a transport.

Description of the Related Art

Commercial transports, such as trains and aircraft (airplanes) implement the use of various computer systems for communication, navigation, control, passenger entertainment, etc. Such computer systems are complex. In certain implementations, computer systems can be interconnected to one another. Such implementations can be common, considering the limited and constrained space a transport, such as an aircraft provides. Oftentimes, computer systems are architected, such that components of different computer systems are placed in the same physical internal network(s) of the transport. Cyber threats or attacks on computer systems are becoming more of a concern, as safety critical computer systems and components in transports become vulnerable to hacking and manipulation.

For example, in aircrafts, if a flight critical system is integrated with or accessible by an inflight entertainment system, a passenger able to access the inflight entertainment system can possibly access and hack or manipulate the flight critical system. There have been accounts of passengers claiming to have hacked and manipulated flight critical systems through inflight entertainment systems that they have been given access to. Access to such inflight entertainment system can vary depending on the passenger. Profiles describing passengers can be assigned before a flight.

Although passengers can be assigned profiles before a flight, concerns can arise as to authenticating whether profiled passengers are sitting in their assigned seats, and the type of access specific passengers have to computer systems, such as an inflight entertainment system. Furthermore, it would be desirable for airlines and transportation security to be able to authenticate and monitor passengers.

SUMMARY OF THE INVENTION

A method, system and computer-usable medium are disclosed for authenticating passengers and monitoring passenger activity in a transport. A passenger is matched to a seat in the transport based on a name and/or identifier. Authentication is performed as to the passenger and the seat. Security questions, biometric recognition, facial recognition, and certificate recognition can be used in the authentication. Access to a set of resources for the passenger is provided based on a predetermined list of resources. Monitoring is performed as to authorized use of the set of resources during a trip or session.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
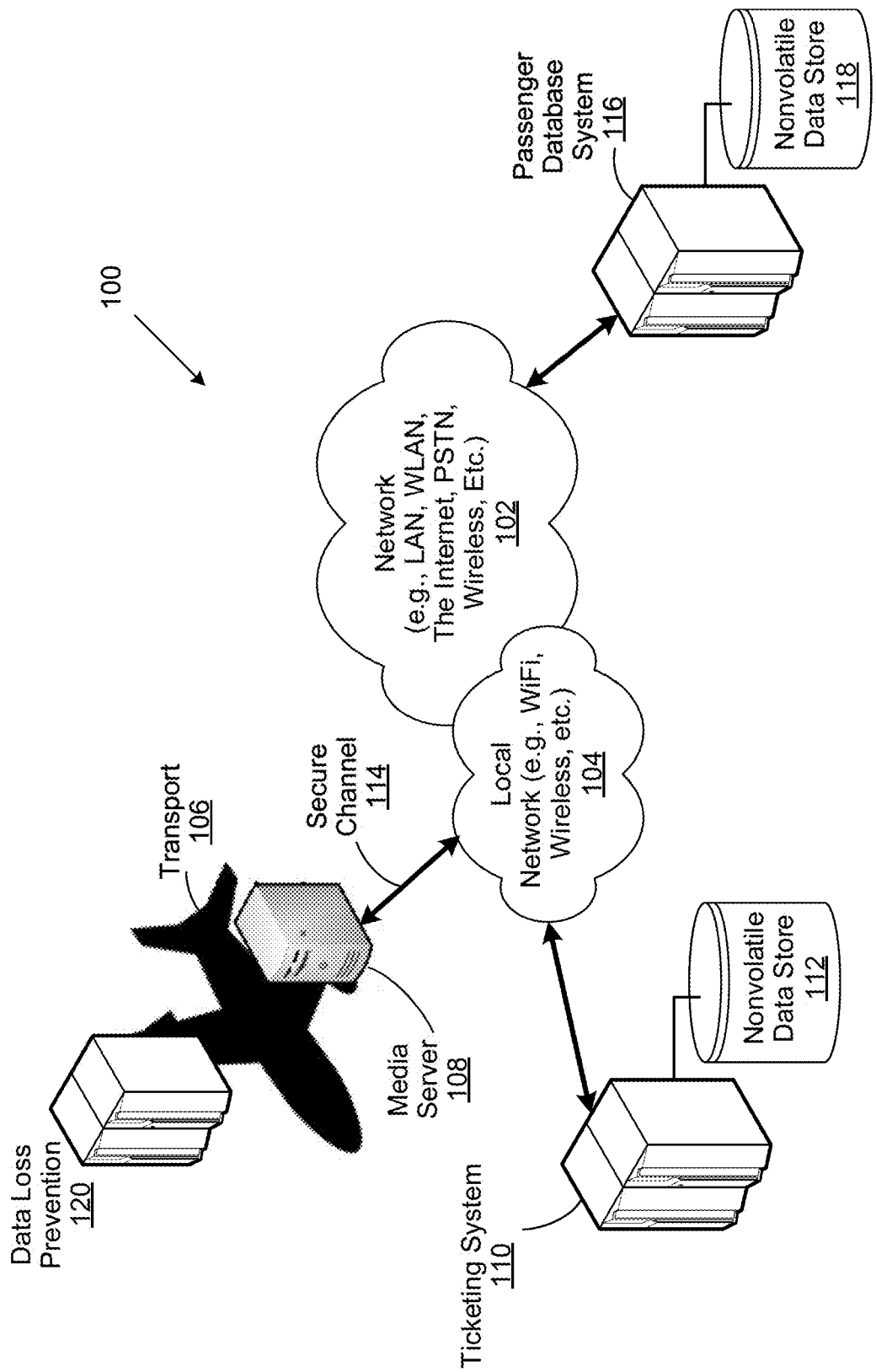
FIG. 1 depicts an environment for authenticating passengers and auditing passenger use of resources in a transport.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a generalized illustration of an environment 100 that can be used to implement the system and method of the present invention. In certain embodiments, the environment includes a network 102. The network 102 can include Local Area Networks (LANs), Wireless Local Area Networks (WLANs), the Internet, the Public Switched Telephone Network (PSTN), other wireless networks. Network 102 can further include other network topology that can be used to interconnect the elements of environment 100. In certain embodiments, the environment can further include a local network 104, which can be connected to the network 102. In certain implementations, the local network 104 can be a dedicated or secure WiFi or wireless network.

The environment 100 provides for a transport 106, such as an aircraft. It is to be understood, that other implementations can include other transports such as trains, ships, etc. Furthermore, other implementations do not necessarily include transports, but can also include theatres, interactive venues, and the like, where customers are assigned specific seats. In general, implementations include instances when passengers, customers, attendees are authenticated and monitored.

In certain embodiments, the transport 106 includes a media server 108. The media server can be configured to connect to a ticketing system 110, where ticketing system 100 is includes or is connected to nonvolatile data store 112. In certain implementations, the ticketing system 110 is a local system, such as local airport ticketing system. In certain implementations, media server 108 can connect to ticketing system 110 using a secure communication channel 114. For example, local network 104 can be implemented as an isolated wireless network or private WiFi network, and a secure communication tunnel or communication channel 114, can be provided for communication between media server 108 and ticketing system 110.

In certain implementations, the ticketing system 110 is connected to a passenger database system 116, were passenger database system 116 includes or is connected to nonvolatile data store 116. The passenger database system 116 can be located in a remote site and is not limited to a single system. In certain implementations, the passenger database system 116 is cloud based. Secure communications through network 102, can be implemented to connect the ticketing system 110 with the passenger database system 116. Passenger database system 116 can include passenger records or profiles related to various flights. In particular, the passenger database system 116 includes passenger records or profiles for current flights in which passengers are authenticated. Passenger records or profiles can include a predetermined list of resources and accessibility to the resources for specific passengers for particular flights. In certain embodiments, an "on board" data loss prevention (DLP) system 120 is included in transport 106. The DLP system 120 can be configured to monitor system and components of the transport 106, including passenger entertainment, communication, flight control, flight management systems. Certain systems and components can allow for passenger access and use; however, there are systems and components that can be flight critical and should not be accessible by passengers. The DLP system 120 can be configured to monitor (audit), restrict, identify, and report passenger attempts and access to acceptable and restricted systems and components.

The DLP system 120 can be configured to control features or access to resources (i.e., systems and components) available to a passenger based on a passenger record or profile. Such features can include the "number of devices/phones that can be connected", "accessibility of such devices/phones", "USB ports available to the passenger", "capability to charge a device/phone", etc. Furthermore, based on the record or profile of the passenger, and specifically the accessibility the passenger has to systems on the transport, DLP system 120 based on suspicious passenger activity, can disable resources (i.e., devices/phones). Disabling can be performed by disabling wireless or hardwired connections when suspicious passenger activity is suspected.

In certain implementations, the media server 108 uploads passenger audit information to ticketing system 110 for passenger tracking. The passenger audit information can be previous passenger information and can provide authentication (e.g., pass or fail) and resource (i.e., passenger use of devices with transport 106) utilization. In certain implementations, passenger audit information can include passenger activity monitored by the DLP system 120 during a flight. Such activity can include authorized and unauthorized activity, such as actual and attempted access to various acceptable and unacceptable systems and components.

The media server 108 can delete previous passenger records or profiles from previous flights from the passenger database system 116, and update passenger records or profiles current flights from the passenger database system 116. In certain implementations, the media server 108 can restart authentication for endpoints (e.g., seat or seatback units) in the transport 106 for a current flight and passengers.

Figure 2:
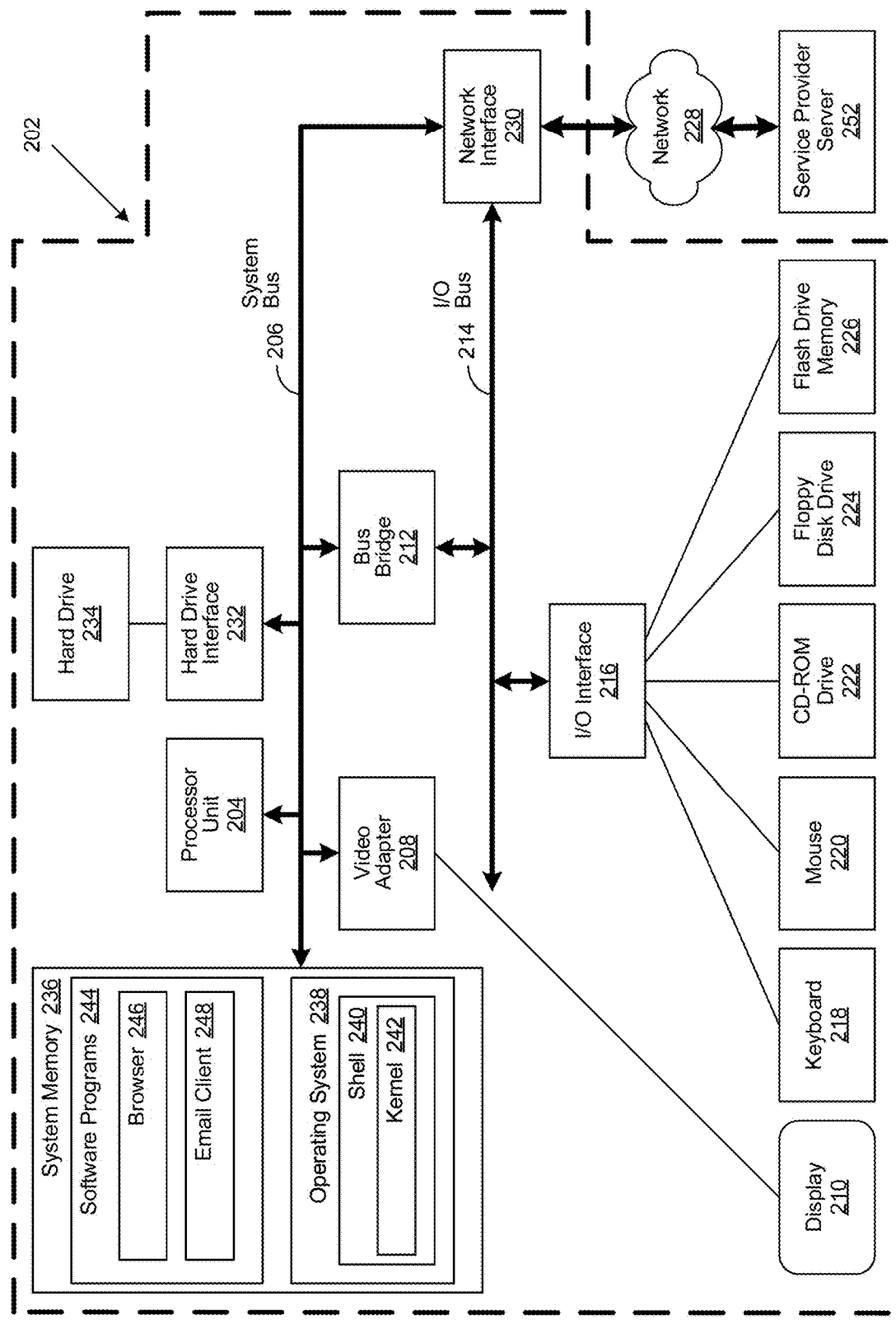
FIG. 2 is a block diagram of an information processing system capable of performing computing operations.

FIG. 2 illustrates an information processing system 202, more particularly, a processor and common components, which is a simplified example of a computer system capable of performing the computing operations described herein. For example, the described servers and systems can be implemented as information processing system 202.

Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports. The information processing system 202 is able to communicate with a service provider server 238 via network 102 using a network interface 230, which is coupled to system bus 206.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using Hyper Text Transfer Protocol (HTTP) messaging, thus enabling communication with service provider server 228.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figures 3, 4:
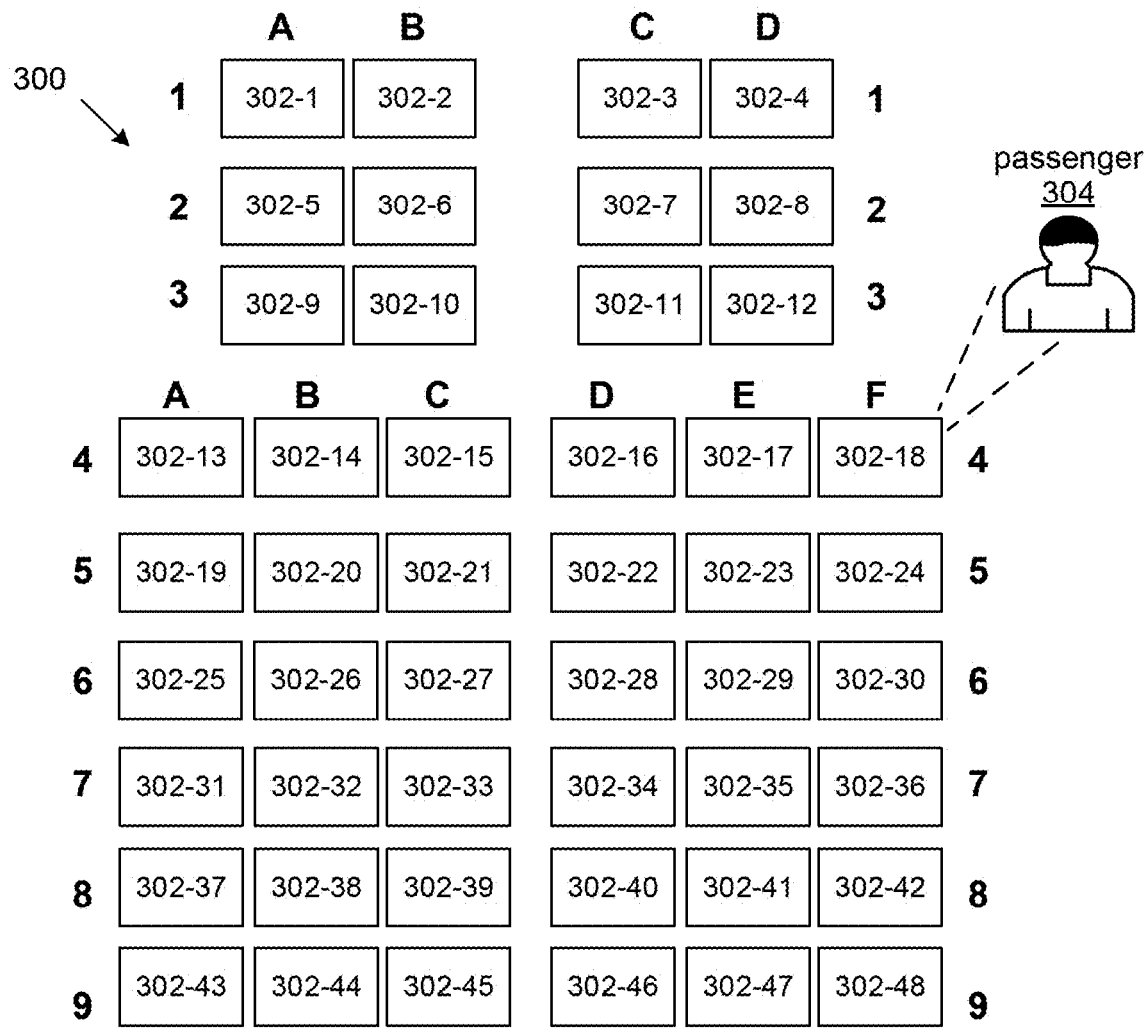
FIG. 3 is a diagram of passenger seat map.
FIG. 4 is a diagram of a passenger record or profile.

FIG. 3 illustrates a diagram of a passenger seat map. The passenger seat map 300 includes seats 302-1 through 302-48, which are identified by row and column. In certain implementations, the physical seats or seatback units represented by seats 302-1 through 302-48 are considered as media endpoints or endpoints in collecting passenger data and providing the passenger data to a collector such as media server 108 described in FIG. 1. In certain embodiments, a media application can be used on or with the physical seats or seatback units.

In certain implementations, seat map 300 relates to passenger seating in a transport, such as transport 106. It is to be understood, that in other implementations, seat map 300 can be used for theatres, interactive venues, and the like, where customers are assigned specific seats. In general, implementations include instances when passengers, customers, attendees are authenticated.

Seat map 300 identifies seats 302-1 through 302-48 by column and row, designating seats by alphabetic column and numeric row identifiers. For example, a passenger 304 is assigned to seat "4F", identified as element 302-18. Therefore, it is desirable to authenticate passenger 304 is the actual passenger sitting in seat "4F" 302-18, and to further authenticate and monitor the use of devices by passenger 304 during a flight.

FIG. 4 illustrates a passenger record or profile. The record or profile 400 is an example of records or profiles that can be included in passenger database passenger database system 116 of FIG. 1. Record or profile 400 can be used in authenticating passengers and provide information as to the devices that passengers are able to use for a flight. In particular implementations, records or profiles, such as profile 400 are used by the DLP system 120 described in FIG. 1, and are considered as historical policies that allow the DLP system 120 to authenticate and authorize resource use of passengers.

In this example, passenger 304 has a current profile (record) 402 with particular fields or entries. The profile 402 includes an entry "flight" 404, which is "UA123"; an entry for "seat" 406 that is matched to the passenger, which is "4F"; an entry for passenger "ID" 408, which is "01054"; an entry for passenger "Name" 410, which is "John Doe"; an entry for "Number of Devices" 412, which is "3"; and an entry for "IDs of Devices" 414, which are "MP01, LT01, and SP002." In addition, a passenger threat list entry 416 is included. In certain implementations, a passenger can be on a certain list, such as a "white" or "black" list, where a black listed passenger can be considered as a potential threat. In this example, the passenger 304 is indicated to be on a black list 418. The black list 418 can further refer to a sub list 420 that the passenger 304 is identified with. Sub list 420 can describe specific threats, severity of threats, past threat activities, etc.

It is to be understood that described fields or entries are an example. Other fields or entries can be added, and/or all or certain of the described fields of profile 402 can be deleted. Passenger records or profiles can include a predetermined list of resources and accessibility to the resources for specific passengers for particular flights.

Figure 5:
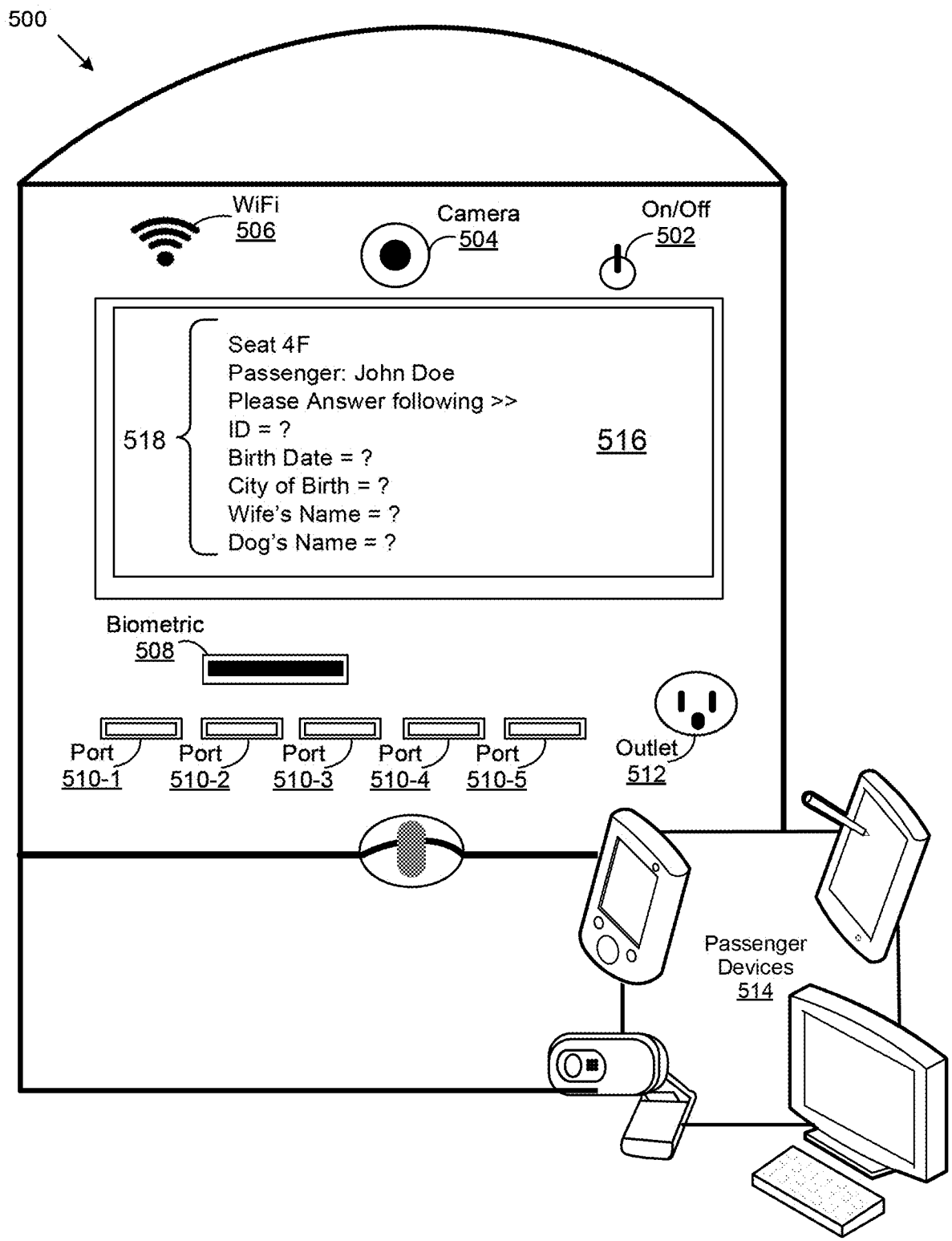
FIG. 5 is a diagram of seat interface to a passenger.

FIG. 5 illustrates a diagram of seat interface to a passenger. In this example, a seatback unit 500 represents a seat interface that can be used by a passenger. The seatback unit 500 can be made available to each passenger and is used for different functions, including collecting passenger data, authenticating and monitoring passengers, allowing passengers to connect their devices to entertainment and communication systems on the transport, and allowing passengers to charge their devices. The seatback unit 500 can be considered as a media endpoint or endpoint.

In certain implementations, the endpoint or seatback unit 500 includes an on/off switch or button 502. The endpoint or seatback unit 500 can also include a camera 504 and wireless connection indicator 506. Certain implementations can also include a biometric reader 508, such as a fingerprint scanner. Camera 504 and biometric reader 506 can be used in certain instances for passenger authentication. For example, camera 504 can be configured with an application for facial recognition, and biometric reader 508 can be configured with an application for fingerprint recognition. The wireless connection indicator 506 can show that a wireless connection is available. Wireless connections can include WiFi, Bluetooth, and near field communication (NFC). In certain implementations, a passenger can be able to connect their devices through such wireless connection(s).

In certain implementations, a passenger can connect through physical ports or connections. Various physical ports can be provided by endpoint or seatback unit 500, such as ports 510-1 to 510-5. Ports 510-1 to 510-5 can provide for various device connections, such as various standards of universal serial bus (USB), Apple® device connections, etc. Such ports can used for media connectivity, and in certain implementations, charging of devices.

Such wireless and physical connections can provide access to various computing resources on the transport 106. A passenger may be given or provided access or use of a particular set of all available computing resources. Furthermore, a passenger can be given limited functionality of particular computing resources. Endpoint or seatback unit 500 can also provide for direct charging of devices through an outlet 512.

Devices that can be connected via wireless or physical connection to endpoint or seatback unit 500 are represented by passenger devices 514. Passenger devices 514 can include a personal computer, a laptop computer, a tablet computer, a personal digital assistant (PDA), a smart phone, a mobile telephone, a digital camera, a video camera, or other device that is capable of storing, processing and communicating data. In certain implementations, the passenger devices 514 communicate to a reporting component of the DLP system 120, where the reporting component allows the DLP system 120 to monitor or audit the use of passenger devices 514.

In certain implementations, the seatback unit 500 includes a monitor or screen 516. The screen 516 can be a touch screen with tactile controls used to enter data. In other implementations, a separate I/O device (not shown) can be used to enter data. In certain operating scenarios, when a passenger takes a seat and the specific passenger's record or profile 400 is downloaded, the screen 516 presents a "welcome" page, followed by a list page that includes a list of security questions 518.

An application can be implemented on the seatback unit 500 that prompts, collects, protects, and communicates the passenger data that includes answers to the security questions 516. In certain implementations, encryption or hashing is used to protect passenger data (e.g., answers to the security questions).

In certain implementations, the passenger data is streamed to a collector, such as media server 108 from the endpoint or seatback unit 500. Media server 108 can transmit such passenger data later to a security information and event management (SEIM) system, such as passenger database system 114 for long term storage. In addition to passenger data, passenger records or profiles 400 can also be streamed in a similar manner.

It is to be understood that other implementations can be used as an endpoint for seatback unit 500. For example, an endpoint with the functionality described as to seatback unit 500 can be implemented on a passenger seat, on an overhead unit above the passenger seat, etc.

Figure 6:
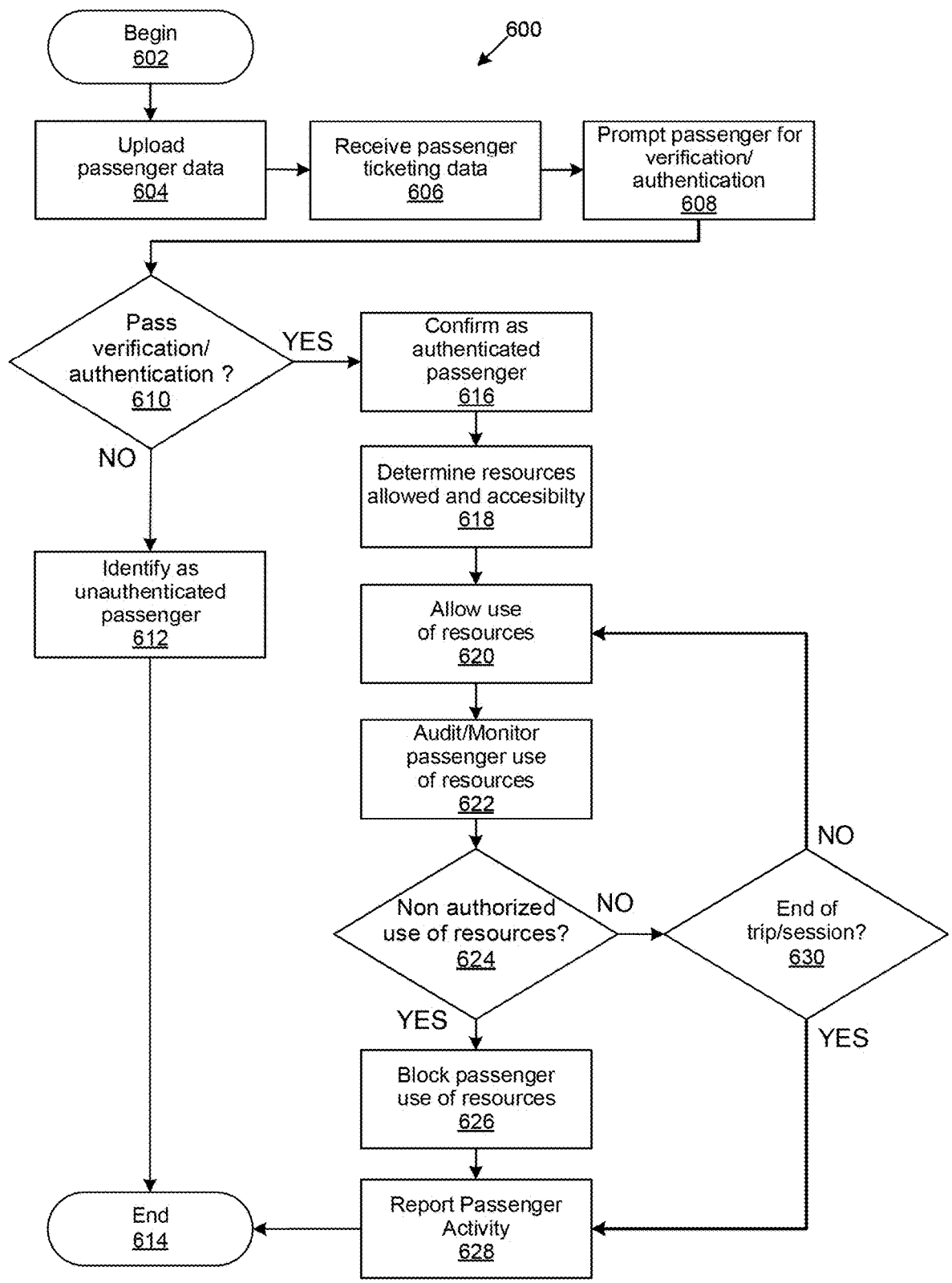
FIG. 6 is a generalized flowchart for authenticating passengers and auditing passenger use of resources in a transport.

FIG. 6 is a generalized flowchart 600 for authenticating passengers in a transport. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602 the process 600 starts. At step 604, passenger data is uploaded. The uploaded passenger data can be initial passenger data indicating that authentication for a passenger is desired. In the context of an airplane flight, the authenticating can take place when a passenger begins boarding an aircraft. A gate agent can confirm that the passenger has boarded the aircraft and the passenger can then take their assigned seat, and authentication of the passenger can occur. In certain instances, when a passenger is reassigned to a different seat, prior to or during a flight, a gate agent or flight crew member can have overwrite permission to change seats before or during in-flight, allowing a continuous audit trail of the passenger. The overwrite permission also can allow the passenger continued use of resources when the seat is changed.

The authentication is directed to determine if the passenger sitting at the seat is the true passenger for that flight (session). Any previous passenger data can be erased. In certain implementations, media server 108 connects with a ticketing system and sends the initial passenger data. Secure channel 114 can be provided between the media server and the ticketing system. At step 606, ticking information is provided regarding the passenger. The ticketing information can include the passenger name, and an identifier (ID) or ticket ID, that is linked to the passenger. Matching includes linking the passenger with the name and/or ID. The linking is part of matching the passenger with the seat. At step 608, the passenger is verified or authenticated. Verification or authentication can include the passenger answering a set of security questions. In other implementations, verification or authentication can be performed through facial recognition using a camera, such as camera 504. Camera 504 can also be implemented to read or scan a certificate provided by the passenger in authenticating the passenger. Other authentication methods can include fingerprint scanning using biometric reader 508.

If the passenger fails verification/authentication, then following the "NO" branch of block 610, at step 612 the passenger is identified as "unauthenticated." At block 614, the process 600 ends. If the passenger passes verification/authentication, then following the "YES" branch of block 610, at step 616, the passenger is confirmed as an authenticated passenger. At step 618, a determination is made to the number of computing resources of the transport, that the passenger is allowed. The determination can include a subset of a total number of available resources on the transport and the accessibility or use by the passenger. At step 620, the passenger is allowed the use of the determined resources. Steps 616, 628, and 620 can be performed by the DLP system 120 as part of historical policies or previous passenger records/profiles. At step 622, auditing or monitoring is performed as to passenger's use of resources. The passenger's use of resources can be authorized or unauthorized and can include details as to what transport systems and/or components were accessed or attempted to be accessed. Other details can include number of attempts and frequency of attempts. The DLP system 120 can perform step 622 as part of active/ongoing (i.e., inflight) auditing or monitoring.

If a determination is made as to unauthorized use of the resources by the passenger, then following the "YES" branch of block 624, at step 626 the passenger is blocked from using the resources. In certain implementations, the blocking can be limited to particular resources, depending on the severity and/or frequency attempted or actual unauthorized use of the resources. The DLP system 120 can perform step 626 to block the use of the resources. At step 628, reporting can be performed of the passenger's activity. If authorized activity is detected, such activity can be reported to transport security authority(ies) and the profile of the passenger can be updated to indicate that the passenger can be a potential security threat. Such unauthorized use of the resources can be reported as part of a passenger's profile or record. For example, depending on the type of unauthorized use, the passenger can be identified as a security threat or risk. At block 614, the process 600 ends.

If it is determined that the trip or session has ended, following the "YES" branch of block 630, at step 628, reporting is performed. At block 614, the process 600 ends. If the flight or session has not ended, then following the "NO" branch of 630, the step 620 is performed, and the passenger continues the use of the resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method to authenticate and monitor passengers comprising:
   matching a passenger with a seat in a transport based on a name or identifier found in a passenger record or profile;
   authenticating the passenger based on the passenger record or profile that includes a potential list of threats as to the passenger, wherein the threats include level, severity and past threats;
   providing access to a set of resources by a passenger's device of the transport to the passenger based on a predetermined list of resources available to the passenger found in the passenger record or profile;
   monitoring authorized use of the set of resources by the passenger's device through a data loss prevention (DLP) system during a trip or session, wherein the DLP system is configured to monitor, restrict, identify, and report passenger attempts and access to components and system of the transport, and is configured to control features or access to resources based on the passenger record or profile; and
   disabling through the DLP system the passenger's device if unauthorized use is determined.

2. The method of claim 1, wherein the authenticating includes one or more of prompting the passenger with one or more security questions and verifying answers to the one or more security questions; biometric recognition; facial recognition; certificate recognition.

3. The method of claim 1 wherein the matching is overwritten to a different seat.

4. The method of claim 1, wherein the set of resources is a subset of all available resources on the transport.

5. The method of claim 1, wherein a secure communication network is provided for communication between an endpoint that represents the seat and a ticketing system that provides passenger data.

6. The method of claim 1 further comprising resetting access to the set of resources at the conclusion of the trip or session.

7. The method of claim 1 further comprising disabling passenger use of the set of resources if suspicious activity is detected during the monitoring.

8. A system comprising:
   a processor;
   a data bus coupled to the processor; and
   a computer-usable medium embodying computer program code, the computer-usable medium being coupled to the data bus, the computer program code used for authenticating and monitoring passengers and comprising instructions executable by the processor and configured for:

matching a passenger with a seat in a transport based on a name or identifier found in a passenger record or profile;

authenticating the passenger based on the passenger record or profile that includes a potential list of threats as to the passenger, wherein the threats include level, severity and past threats;

providing access to a set of resources by a passenger's device of the transport to the passenger based on a predetermined list of resources available to the passenger found in the passenger record or profile;

monitoring authorized use of the set of resources by the passenger's device through a data loss prevention (DLP) system during a trip or session, wherein the DLP system is configured to monitor, restrict, identify, and report passenger attempts and access to components and system of the transport, and is configured to control features or access to resources based on the passenger record or profile; and disabling through the DLP system the passenger's device if unauthorized use is determined.

9. The system of claim 8, wherein the authenticating includes one or more of prompting the passenger with one or more security questions and verifying answers to the one or more security questions; biometric recognition; facial recognition; certificate recognition.

10. The system of claim 8, wherein the monitoring includes reporting unauthorized use by the passenger of the resources.

11. The system of claim 8, wherein the set of resources is a subset of all available resources on the transport.

12. The system of claim 8, wherein a secure communication network is provided for communication between an endpoint that represents the passenger seat and a ticketing system that provides passenger data.

13. The system of claim 8 further comprising resetting access to the set of resources at the conclusion of the trip or session.

14. The system of claim 8, further comprising disabling passenger use of the set of resources if suspicious activity is detected during the monitoring.

15. A non-transitory, computer-readable storage medium embodying computer program code, the computer program code comprising computer executable instructions configured for:

matching a passenger with a seat in a transport based on a name or identifier found in a passenger record or profile;

authenticating the passenger based on the passenger record or profile that includes a potential list of threats as to the passenger, wherein the threats include level, severity and past threats;

providing access to a set of resources by a passenger's device of the transport to the passenger based on a predetermined list of resources available to the passenger found in the passenger record or profile;

monitoring authorized use of the set of resources by the passenger's device through a data loss prevention (DLP) system during a trip or session, wherein the DLP system is configured to monitor, restrict, identify, and report passenger attempts and access to components and system of the transport, and is configured to control features or access to resources based on the passenger record or profile; and disabling through the DLP system the passenger's device if unauthorized use is determined.

16. The non-transitory, computer-readable storage medium of claim 15, wherein the authenticating includes one or more of prompting the passenger with one or more security questions and verifying answers to the one or more security questions; biometric recognition; facial recognition; certificate recognition.

17. The non-transitory, computer-readable storage medium of claim 15, wherein the set of resources is a subset of all available resources on the transport.

18. The non-transitory, computer-readable storage medium of claim 15, wherein a secure communication network is provided for communication between an endpoint that represents the passenger seat and a ticketing system that provides passenger data.

19. The non-transitory, computer-readable storage medium of claim 15, further comprising resetting access to the set of resources at the conclusion of the trip or session.

20. The non-transitory, computer-readable storage medium of claim 15, further comprising disabling passenger use of the set of resources if suspicious activity is detected during the monitoring.

* * * * *